United States Patent [19]

McDaniel et al.

[11] 4,248,735

[45] Feb. 3, 1981

[54] TREATMENT OF SILICA

[75] Inventors: Max P. McDaniel; Melvin B. Welch, both of Bartlesville, Okla.

[73] Assignee: Phillips Petroleum Company, Bartlesville, Okla.

[21] Appl. No.: 44,809

[22] Filed: Jun. 1, 1979

Related U.S. Application Data

[63] Continuation-in-part of Ser. No. 857,552, Dec. 5, 1977, abandoned.

[51] Int. Cl.$^3$ .................. B01J 31/02; B01J 31/12; B01J 27/02; B01J 27/06
[52] U.S. Cl. .................. 252/428; 252/429 R; 252/430; 252/431 R; 252/431 C; 252/441; 252/443; 252/439
[58] Field of Search .............. 252/428, 429 R, 431 R, 252/431 C, 443, 439, 430, 441; 526/100, 106, 130

[56] References Cited

U.S. PATENT DOCUMENTS

| | | | |
|---|---|---|---|
| 2,885,349 | 5/1959 | Hansford | 252/439 X |
| 3,349,067 | 10/1967 | Hill | 526/100 X |
| 3,353,916 | 11/1967 | Lester | 252/441 X |
| 3,362,946 | 1/1968 | Hogan | 260/94.9 |
| 3,365,439 | 1/1968 | Bjornson | 260/94.9 |
| 3,504,043 | 3/1970 | Kominami et al. | 252/441 X |
| 3,666,670 | 5/1972 | Gilbert et al. | 252/449 X |
| 3,946,020 | 3/1976 | Minato et al. | 252/449 X |
| 3,953,413 | 4/1976 | Hwang et al. | 252/430 X |
| 3,976,632 | 8/1976 | Delop | 252/430 X |
| 4,027,088 | 5/1977 | Matsuura et al. | 526/124 |
| 4,054,538 | 10/1977 | Johnson et al. | 526/130 X |
| 4,150,209 | 4/1979 | Katzen et al. | 526/130 X |

FOREIGN PATENT DOCUMENTS

| | | | |
|---|---|---|---|
| 863932 | 2/1971 | Canada | 252/439 |
| 2278710 | 2/1976 | France | |
| 1415646 | 11/1975 | United Kingdom | |

OTHER PUBLICATIONS

Infrared Study of OH & NH$_2$ Groups on the Surface of a Dry Silica Aerogel, J. B. Peri, vol. 70, #9, 1966, The Journal of Physical Chemistry, pp. 2937-2945.

Chem. Abstracts, vol. 83, 1975, ref. 59929b, p. 50, Zakharov et al., Cat. for poly of ethylene.

*Primary Examiner*—Delbert E. Gantz
*Assistant Examiner*—William G. Wright

[57] ABSTRACT

A silica-containing composition suitable for supporting chromium to produce a catalyst capable of giving high melt flow olefin polymers for such applications as injection molding and the like requiring a narrow molecular weight distribution, is produced by treating a silica-containing material at an elevated temperature with either (1) CO, (2) a bromine or iodine component, or (3) an oxygen-containing sulfur component, more specifically a carbon, oxygen and sulfur-containing component. Thereafter, anhydrous chromium can be added, for instance, by means of a hydrocarbon solution of a soluble chromium compound, and the resulting composition activated in air to produce a catalyst. The bromine or iodine treated silica contains bound bromine or iodine if the treating agent is HBr, HI, an organic halide of Br or I or elemental Br or I used in conjunction with a reducing agent. This material is a novel composition of matter and is suitable for use as a reinforcing agent in rubber or plastics and as a support for a chromatographic column in addition to being suitable for supporting a chromium compound to produce a catalyst.

48 Claims, 2 Drawing Figures

MAGNETIC FIELD - GAUSS
PARTIALLY OXIDIZED SILICA +
IODINE (-196, LP) FILE MAMCG

ESR DERIVATIVE SPECTRUM

FIG. 1

MAGNETIC FIELD - GAUSS
VARIAN REFERENCE SAMPLE: G=2.0028

ESR DERIVATIVE SPECTRUM

FIG. 2

TREATMENT OF SILICA

CROSS REFERENCE TO RELATED APPLICATION

This is a continuation-in-part of copending application Ser. No. 857,552, filed Dec. 5, 1977, now abandoned.

BACKGROUND OF THE INVENTION

This invention relates to the preparation of treated silica.

Chromium oxide catalysts on a silica-containing support can be used to prepare olefin polymers in a hydrocarbon solution to give a product having excellent characteristics from many standpoints. Supported chromium oxide catalysts can also be used to prepare olefin polymers in a slurry system wherein the polymer is produced in the form of small particles of solid material suspended in a diluent. This process, frequently referred to as a particle-form process, has the advantage of being less complex. However, certain control operations which are easily carried out in the solution process are considerably more difficult in the particle-form process. For instance, in a solution process, control of the molecular weight can be effected by changing the temperature with lower molecular weight (higher melt flow) being obtained at the higher temperatures. However, in the slurry process, this technique is inherently limited since any effort to increase the melt flow to any appreciable extent by increasing temperature would cause the polymer to go into solution and thus destroy this slurry or particle-form process.

Heretofore silica has been treated with chlorine to produce a chlorinated silica but efforts to halogenate silica with bromine or iodine have not been successful.

SUMMARY OF THE INVENTION

It is an object of this invention to provide a catalyst capable of giving high melt flow polymer; it is a further object of this invention to provide a catalyst suitable for use in slurry polymerization systems; it is a further object of this invention to produce an improved support for chromium-containing catalysts; it is a further object of this invention to provide an improved method of producing a chromium-containing catalyst; and it is yet a further object of this invention to provide a catalyst capable of giving polymer suitable for injection molding and other applications requiring high melt flow and narrow molecular weight distribution; it is yet a further object of this invention to produce a bromine- or iodine-containing silica composition; and it is yet a further object of this invention to provide a novel stable free radical composition.

In accordance with this invention, a silica-containing composition is treated at an elevated temperature with an ambient selected from (1) carbon monoxide, (2) a bromine- or iodine-containing component or (3) an oxygen-containing sulfur-containing component, more specifically a carbon, oxygen and sulfur-containing component.

BRIEF DESCRIPTION OF THE DRAWINGS

In the drawings forming a part hereof.

DESCRIPTION OF THE PREFERRED EMBODIMENTS

The silica-containing material to be treated can be selected from catalytic grade silica, silica-alumina, silica-boria, silica-titania, silica-zirconia, and the like, and mixtures thereof, in which the silica constitutes from 80 to 100 weight percent of the silica-containing material. Suitable silica-containing materials are the catalyst supports broadly disclosed in Hogan et al, U.S. Pat. No. 2,825,721 (Mar. 4, 1958), the disclosure of which is hereby incorporated by reference. When the purpose is to produce a catalyst support the silica-containing material preferably is a cogel, that is, a silica produced by coprecipitating titanium and silica as disclosed in Dietz, U.S. Pat. No. 3,887,494 (June 3, 1975), the disclosure of which is hereby incorporated by reference. For instance, this cogel formation can be carried out by adding a titanium compound to a mineral acid, introducing an alkali metal silicate into the acid containing said titanium compound to form a hydrogel, aging the hydrogel for a time of greater than 1 hour, washing the thus aged hydrogel to produce a substantially alkali metal free hydrogel, forming a mixture comprising the thus washed hydrogel and a normally liquid oxygen-containing water soluble organic compound, and separating said organic compound and water from said mixture to form a xerogel. The titanium is present in these cogels in an amount within the range of 0.1 to 10, preferably 0.5 to 5 weight percent titanium based on the weight of the dried cogel (xerogel).

The treating agents are (1) carbon monoxide, (2) a halogen component selected from bromine or bromine-containing ambients or iodine or iodine-containing ambients and (3) an oxygen-containing sulfur composition preferably containing an organic sulfur compound, more specifically a carbon, oxygen and sulfur-containing compound.

In the first embodiment utilizing carbon monoxide, the ambient can be pure carbon monoxide or carbon monoxide in admixture with an inert gas such as nitrogen, argon, helium, etc. In such mixtures, the carbon monoxide content usually ranges from about 1 to 90 mole percent.

In the second embodiment wherein a bromine-containing material is utilized, bromine vapor itself can be used either alone or in combination with air or CO, preferably CO. Other suitable bromine-containing materials are HBr, and organic bromides like $CH_3Br$ which can be used alone or with bromine vapor. Generally, bromine or the bromine-containing compound constitutes from 0.01 to 10 mole percent of the mixture where a mixture with air or CO is used, and more preferably from about 0.1 to about 5 mole percent (the remainder being air or CO). Alternatively, the active ingredients (the bromine component or the bromine component plus air or CO) can constitute 1–90 mole percent of the ambient and the remainder can be an inert gas such as nitrogen, argon, or helium. Sufficient bromine is used during the contacting process whether in the form of bromine or a bromine-containing compound such as HBr by regulating its concentration or length of contacting time such that a weight ratio of the silica-containing material such as a support to bromine ranging from about 100:1 to about 0.5:1 is employed.

In the second embodiment where an iodine-containing material is utilized, iodine vapor itself can be used either alone or in combination with air or CO, preferably CO. Other suitable iodine-containing materials are HI and organic iodides such as $CH_3I$ which can be used alone or with iodine vapor. Generally, iodine or the iodine-containing compound constitutes from 0.01 to 10 mole percent of the mixture where a mixture with air or CO is used, and more preferably from about 0.1 to about 5 mole percent (the remainder being air or CO). Alternately, the active ingredient (the iodine component or the iodine component plus air or CO) can constitute 1–90 mole percent of the ambient and the remainder can be an inert gas such as nitrogen, argon or helium. Sufficient iodine is used during the contacting process whether in the form of iodine or an iodine-containing compound such as HI by regulating its concentration or length of contacting time such that a weight ratio of the silica-containing material such as a support to iodine ranging from about 100:1 to about 0.5:1 is employed.

Alternatively, an iodine or bromine solution (or in the case of bromine, liquid bromine) can be used to impregnate the silica-containing composition and thereafter the thus impregnated composition can be treated at the elevated temperature with CO.

This second embodiment produces a novel silica-halogen composition of matter definable without resort to the method of manufacture when a reducing agent such as CO or hydrogen is used with the bromine or iodine or when HI or HBr, an organic bromide or an organic iodide is used. When the silica-containing material is heated to an elevated temperature in CO as defined herein and contacted with $Br_2$ or $I_2$, the $Br_2$ or $I_2$ is absorbed onto the silica. It does not come off at 1600° F. (871° C.) in CO or $N_2$. The reaction is postulated to be with surface silanol groups as follows:

$$\equiv Si-OH + CO + Br_2 \rightarrow \equiv SiBr + CO_2 + HBr \text{ or}$$

$$\equiv Si-OH + CO + I_2 \rightarrow \equiv SiI + CO_2 + HI.$$

The composition can contain from 0.01 to 20 preferably 3 to 10 weight percent Br or I based on the weight of silica. This can also be expressed in terms of the millimoles of halogen per 100 square meters of surface area of the silica, 0.001 to 1 millimoles/100 square meters, preferably 0.03 to 0.3 millimoles/100 square meters being suitable. The reaction product is remarkable in that bromine or iodine (which are normally volatile at even room temperature) are held fast to the silica even at red heat (800°–900° C.). Even $SiI_4$ evaporates at 80° C. This composition can be used as a reinforcing agent for rubber and plastics, or a chromatography support or the surface bromide or iodine can be burned off and the composition is a superior support for chromium to produce an olefin polymerization catalyst.

Further with respect to burning off the iodine or bromine, a second new composition of matter (a stable silica free radical) is formed when the above silica-iodide or silica-bromide is exposed to oxygen at elevated temperatures (300°–800° C.). A purple gas is released ($I_2$) in the case of the silica-iodide and a red gas in the case of bromine and analysis then shows that the silica contains little or no iodide or bromide. Since oxygen is a stronger oxidizing agent than iodine or bromine, it is likely that oxide would replace iodide or bromide releasing iodine or bromine gas. But ordinary oxide is a two electron oxidizing agent whereas iodide or bromide consumes only one electron. In solution or in gas phase, the reaction between one oxygen and two iodides is simple:

$$4I^{\ominus} + O_2 \rightarrow 2I_2 + 2O^{\ominus}$$

But on a silica such a reaction is difficult because each iodide or bromide is fixed and isolated on the surface. The result is a highly novel reaction and product. Each iodide uses less than the maximum oxidizing capacity probably as follows:

$$\equiv SiI + \tfrac{1}{2}O_2 \rightarrow \equiv Si-O. + \tfrac{1}{2}I_2$$

Similarly with bromine, the equation would be $$\equiv Br + \tfrac{1}{2}O_2 \rightarrow \equiv Si-O. + \tfrac{1}{2}Br_2$$

Figure 1:
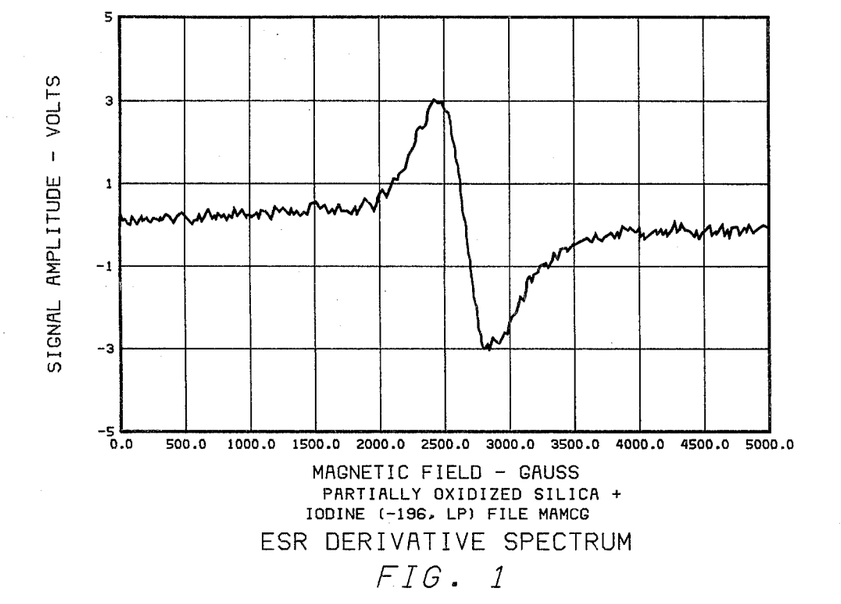
FIG. 1 is an ESR spectrum of a free radical containing silica produced in accordance with an alternate embodiment of this invention and FIG. 2 is an ESR spectrum of a known free radical containing reference sample.

The product is unusual in that the oxide radical O. contains an unpaired electron and is thus normally highly reactive, not existing under normal circumstances except as short lived intermediates in explosions and other fast reactions. But bound to a silica surface, it is stabilized. The electron spin resonance spectrum set out in FIG. 1 shows an unusually powerful signal which proves the existence of stable free radicals. Using the magnetic field at mid resonance, and the pitch reference signal set out in FIG. 2, a g value of 2.0448 can be calculated which characterizes the ESR spectra.

Figure 2:
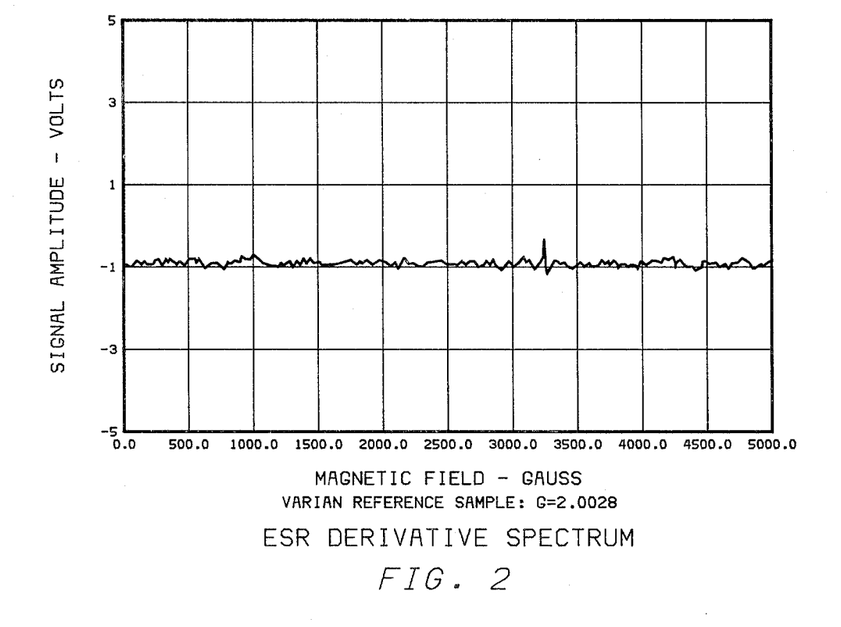

The details of the calculations and conditions used to arrive at a g of 2.0448 for the silica-iodine sample from FIGS. 1 and 2 are as follows.

OUTPUT FROM ESR DATA ACQUISITION PROGRAM

Sample Parameters:
Description—Partially oxidized silica + iodine (−196,LP) file MAMCG
Modulation—100
Gain—1000
Temperature—196.0 C.
Sample in—Liq. $N_2$ Dewar
Derivative Maximum 0.7569754E−05 Volts at 2436.9 Gauss.
Derivative Minimum −0.7948365E−05 Volts at 2847.2 Gauss.
Absorption Maximum 0.3868732E−02 Volts*Gauss at 2664.1 Gauss.
Area of Absorption 0.3348080E+0.1 Volts*-(Gauss)**2.
G = 2.0448
Reference Parameters:
Description—Varian reference sample: G = 2.0028
Modulation—400
Gain—400
Temperature—26.0 C.
Sample in—Cavity
Derivative Maximum 0.4973989E−04 Volts at 3251.3 Gauss.
Derivative Minimum −0.2294782E−04 Volts a at 3276.5 Gauss.
Absorption Maximum 0.6870860E−02 Volts*Gauss at 2721.0 Gauss.
Area of Absorption 0.1862722E+02 Volts*-(Gauss)**2.
Magnetic Field Parameters:
Center field 2500.0 Gauss.
Scan range 5000.0 Gauss.

Microwave Power 15.0 DB. Attenuation.
Number of Points—793

Of course, applicants do not wish to be bound by the theory that the species is ≡Si—O.; it could be something else such as ≡Si—O$_2$.. But the ESR spectrum proves the existence of a stable free radical and therefore a unique composition because silica or silica iodide does not produce a signal. Since radicals are highly reactive, this opens up a number of possibilities to use silica as a reactant.

As between iodine and bromine, iodine is preferred in producing the silica-halogen compositions for use as a chromatography support or for use as an intermediate for producing a stable free radical by burning off the halogen or producing a catalyst by burning off the halogen and adding chromium or other catalytic material.

The production of free radical-containing silica by gamma irradiation is known but this causes other degradation of the silica. The production of a small amount of free radicals in silica by mechanically grinding is also known but such a composition exhibits only a small amount of free radicals and is physically broken down. The instant invention gives a non-degraded (by either electromagnetic irradiation or physical grinding) silica, containing a strong presence of free radicals, i.e., a g value of 1.8 to 2.2, for instance.

In the third embodiment wherein a sulfur-containing material is utilized, it is preferred that there be present sulfur, oxygen and carbon. Accordingly, mixtures of a sulfur-containing compound, such as carbon disulfide, and an oxygen-containing compound, such as a carboxylic acid or an alcohol, can be used. Most preferred is carbonyl sulfide since it contains both oxygen, sulfur and in addition carbon. Other exemplary sulfur-containing compounds include carbon monosulfide, carbon subsulfide, methanethiol, 2-methyl-1-propanethiol, eicosanethiol, benzenethiol, para-benzenedithiol, thiophene, thiophene-2-thiol, 1,3,3-propanetrithiol, dimethylsulfide, diethylsulfide, diphenylsulfide, benzylphenylsulfide, dimethylsulfide, di-4-tolydisulfide, 2,2'-dinaphthyl disulfide, diethyltrisulfide, and the like. Generally, a weight ratio of supported catalyst to organic sulfur compound ranging from about 100:1 to about 0.1:1, more preferably from about 20:1 to 2:1 have been found suitable for this purpose. Since the chromium is a relatively small part of the total catalyst, the weight ratio of the silica-containing material to the sulfur-containing compound is essentially the same, i.e., from about 100:1 to about 0.1:1 more preferably from about 20:1 to 2:1.

The sulfur-containing material can be used alone or diluted with an inert gas such as nitrogen, argon or helium. If so diluted, the sulfur-containing material will generally constitute 1-90 mole percent of the mixture.

Suitable alcohols for use in conjunction with the sulfur-containing materials include saturated and unsaturated aliphatic and aromatic alcohols with boiling points of about 300° C. or less as a matter of convenience. Particularly preferred alcohols from an economic standpoint and ready availability are methanol and isopropanol.

Suitable carboxylic acids for this purpose include saturated and unsaturated compounds which are normally liquid as a matter of convenience. A fatty acid, particularly acetic acid, is presently preferred because of ready availability and low cost.

The alcohol or acid if used can be used in an amount so as to give a mole ratio of the sulfur-containing material to the alcohol or acid within the range of 0.1:1 to 10:1.

These treatments are carried out at a temperature within the range of 500°–1000° C., preferably 750°–925° C. The time for this treatment is at least 5 minutes, preferably 20 minutes to 10 hours, more preferably 2 to 8 hours. Shorter times, of course, are generally employed at the higher temperatures and longer times at the lower temperatures. Two to 8 hours are especially preferred times for reduction temperatures in the range of 750°–925° C., for instance. With elemental iodine plus CO which is preferred, temperatures of 700°–950°, preferably 750°–925° C. and times of 1–4 hours are particularly preferred. About 800° C. appears to be optimum. The term "reduction" is used since the treating agents are reducing agents although the silica is not believed to be reduced in the normal sense of the word, i.e., the treatment is carried out under reducing conditions.

After the treatment, if the agent is a bromine- or iodine-containing material employed in the presence of CO, a surface bromide or iodide compound is formed and it is essential or at least highly preferred that the material be given a treatment in air or other oxygen-containing ambient to burn off surface bromide or iodide if it is to be impregnated with chromium to form a catalyst. With the CO or sulfur treatment, this oxidizing treatment is preferred but not essential since a similar surface compound is not formed. This oxidizing treatment is carried out by simply heating the bromine- or iodine-treated support in a dry oxygen-containing ambient, for instance, air at a temperature ranging from about 300°–1000° C., preferably about 525°–925° C., for a time ranging from 10 minutes to 10 hours, more preferably from 1 to 5 hours. Bromine gas is released from the catalyst during this step, and is replaced by oxide groups, leaving an improved catalyst support in those instances where a bromine component is used under conditions to give bound bromine. Similarly, iodine is given off from supports similarly treated with iodine during that treatment to burn off the iodine. But iodine, like bromine is not given off by heating at 871° in CO or N$_2$.

The support after the reducing treatment and the subsequent oxidation, if employed is then cooled and the chromium added without the introduction of water. Suitable chromium compounds are selected from diarene chromium compounds as described in Delap, U.S. Pat. No. 3,976,632 (Dec. 4, 1974), the disclosure of which is hereby incorporated by reference; alkyl or aryl esters of chromic acid and chromium acetylacetonate as described in Hill, U.S. Pat. No. 3,349,067 (Oct. 24, 1967), the disclosure of which is hereby incorporated by reference. Bis-(cyclopentadienyl)chromium(II) compounds as described in Karpinka, U.S. Pat. No. 3,709,853 (Jan. 9, 1973), the disclosure of which is hereby incorporated by reference and silyl chromates as described in Johnson, U.S. Pat. No. 3,704,287 (Nov. 28, 1972), the disclosure of which is hereby incorporated by reference. Generally, a solution or a slurry of the chromium compound in a dry organic liquid inert to the compound and support is used to contact the treated support. Examples of suitable organic liquids include paraffins such as n-heptane, cycloparaffins such as cyclohexane and aromatic hydrocarbons such as benzene. Following the contacting, the composite is dried. Sufficient chromium is used to give 0.001 to 10, preferably 0.1 to 5, more preferably 0.5 to 1 weight percent based on the weight of the silica-containing base.

The composite after incorporation of the chromium compound is then activated in a manner conventional in the art for the particular type of chromium compound used. Preferably, the composite is activated by contact with an oxygen-containing ambient such as air at temperatures ranging from about 15°–870° C., preferably 315°–760° C., more preferably 300°–400° C. for sulfur-treated supports, 300°–500° C. for bromine- or iodine-treated supports, and 400°–600° C. for CO-treated supports. As noted, the preferred ambient is air. However, any oxygen-containing ambient having from 2–100% oxygen and from 0–98% of an inert gas such as nitrogen can be used. In some instances, it is desirable to use a controlled smaller amount of oxygen by utilizing a nitrogen-air mixture. It is also possible, though much less preferred, to activate the $\pi$-bonded organochromium compounds, particularly the dicyclopentadienyl chromium(II) compounds in an inert atmosphere such as nitrogen for the same times and temperatures used with oxygen. Following the activation, the catalysts are cooled, if necessary, and stored in a dry, inert atmosphere until ready for use. $NO_2$, $N_2O$ and oxygen-containing halogen compounds can also be used as the oxidizing agent. Suitable oxygen-containing halogen compounds are $I_2O_5$ and $Cl_2O$.

The activation times will generally be at least 5 minutes, preferably 10 minutes to 10 hours, more preferably 30 minutes to 3 hours. The concentration of the chromium compound is such that the final activated catalyst contains from 0.001 to 10 preferably 0.1 to 5, more preferably about 1 weight percent chromium based on the weight of the chromium compound and support.

The catalysts of this invention can be used to polymerize at least one mono-1-olefin containing 2 to 8 carbon atoms per molecule. The invention is of particular applicability in producing ethylene homopolymers and copolymers from mixtures of ethylene and 1 or more comonomers selected from 1-olefins or dienes containing 3 to 8 carbon atoms per molecule. Exemplary comonomers include aliphatic 1-olefins, such as propylene, 1-butene, 1-hexene, and the like and conjugated or non-conjugated diolefins, such as 1,3-butadiene, isoprene, piperylene, 2,3-dimethyl-1,3-butadiene, 1,4-pentadiene, 1,7-hexadiene, and the like and mixtures thereof. Ethylene copolymers preferably constitute about 90, preferably 95 to 99 mole percent polymerized ethylene units. Most preferred monomers are at least one of ethylene, propylene, 1-butene, and 1-hexene.

The polymers can be prepared from the activated catalysts of this invention by solution polymerization, slurry polymerization, and gas phase polymerization techniques using conventional equipment and contacting processes. However, the catalysts of this invention are particularly suitable in slurry polymerizations for the production of high melt index (MI) polymers, i.e., polymers having MI values in the 1 to 15 range and above at 102° C. polymerization temperature in the absence of molecular weight modifiers, such as hydrogen, and molecular weight distribution value sufficiently narrow to be of commercial interest for applications such as injection molding. For example, ethylene homopolymers exhibiting a melt index in the 1 to 15 range can be obtained by contact with the catalyst of this invention, whereas otherwise identical catalyst using a base conventionally prepared yield fractional MI polymers, i.e. polymer of a MI of less than 1 at a reactor temperature of 102° C. At higher reactor temperatures, higher MI and lower HLMI ratio values are obtained. Thus, for a comparison between a control run and an invention run to be valid they must be at the same polymerization temperature. At a reactor temperature of 110° C., polymers of 15 to 35 MI and higher can be produced as compared with polymers of 5 to 6 maximum MI without the treatment of the support set out in this invention. The high MI polymers made at 110° C. reactor temperature have HLMI/MI (high load MI/regular MI) values ranging from about 33 to 38 with $M_w/M_n$ ratios of about 4. $M_w$ is weight average molecular weight, $M_n$ is number average molecular weight; these values can be determined by means of GPC. Such resins can be injection molded in conventional apparatus to form tough, low warpage articles.

As can be seen, in order for a fair comparison to be made, it must be done between an invention run and a control run carried out at the same polymerization temperature. Higher melt flow and better molecular weight distribution as evidenced by lower HLMI/MI ratios are obtained at the higher temperatures. However, as is noted hereinabove, there is a practical limit to the maximum temperature which can be utilized in a particle-form process. The runs herein were carried out at a relatively low temperature simply because of the greater ease of measuring the melt index values at the lower levels. Actually, polymerization is generally carried out in conventional systems at the highest temperature possible without putting the polymer into solution so as to get the highest possible melt index. However, with this invention, polymerization at this temperature produced such high melt index polymer that it was difficult to measure and hence lower polymerization temperatures were generally used.

Particle form polymerizations are carried out in an inert diluent such as a paraffin, aromatic or cycloparaffin hydrocarbon at a temperature where the resulting polymer is insoluble. For predominantly ethylene polymer, the particle form process is carried out at a temperature of 66°–110° C.

The catalysts of this invention can be used with conventional cocatalysts if desired. Also, hydrogen can be used to further increase the MI if desired.

EXAMPLE 1 (EMBODIMENT 1)

Samples of a dried, coprecipitated silica-titania cogel prepared as described in said U.S. Pat. No. 3,887,494, were heated in a fluidized bed quartz activator in an atmosphere of either pure, dry carbon monoxide or dry air for 4 hours at 1600° F. (870° C.). Gas flow rate was 42 liters per hour in each instance. Following this treatment, individual portions of the CO-treated support and the air-treated support were impregnated with a 1 weight percent solution of dicumene chromium n-hexane sufficient to obtain composites each containing either 0.5 or 1 weight percent of the chromium compound calculated as chromium, based on the dry weight of support plus chromium compound. Several catalyst samples were also prepared by impregnation of the CO-treated support as described above with a 1 weight percent solution of t-butyl chromate in n-hexane sufficient to provide 0.5 weight percent chromium on a dry basis. Each composite was dried to remove solvent and each was charged to the activator, unless otherwise indicated, under specified temperatures for 2 hours for activation. Samples of each recovered catalyst were used in the particle form polymerization of ethylene at 215° F. (102° C.).

The treating conditions employed and polymer melt index (MI) values obtained are presented in Table I. A column is also included for the ratio of high load melt index/melt index (HLMI/MI) determined for each polymer. The ratios are related to molecular weight distribution of the polymer, the smaller the number, the narrower the molecular weight distribution. Each MI value is adjusted for a productivity value of 5000 g polymer/g catalyst to give a true basis for comparing results.

Table I

Effect Of Support Pretreatment According To Embodiment 1 On Polymer Melt Index

| Run[1] No. | Support Pretreatment Ambient | Wt. % Chromium In Catalyst | 2 Hour Air Activation °F. | °C. | Polymer MI | HLMI/MI |
|---|---|---|---|---|---|---|
| 1[2] | air | 0.5 | 80 | 27 | 0.74 | 42 |
| 2 | air | 0.5 | 600 | 316 | 0.74 | 61 |
| 2a | CO | 0.5 | 600 | 316 | 1.5 | 54 |
| 3 | air | 0.5 | 800 | 427 | 0.88 | 58 |
| 3a | CO | 0.5 | 800 | 427 | 2.2 | 58 |
| 4a | CO | 0.5 | 900 | 482 | 2.9 | 50 |
| 5 | air | 0.5 | 1000 | 538 | 1.2 | 51 |
| 5a | CO | 0.5 | 1000 | 538 | 2.8 | 55 |
| 6 | air | 0.5 | 1200 | 649 | 0.87 | 61 |
| 6a | CO | 0.5 | 1200 | 649 | 3.1 | 55 |
| 7a | CO | 0.5 | 1300 | 704 | 1.8 | 52 |
| 8 | air | 0.5 | 1400 | 760 | 0.55 | 67 |
| 8a | CO | 0.5 | 1400 | 760 | 1.2 | 57 |
| 9 | air | 0.5 | 1600 | 871 | 0.56 | 78 |
| 9a | CO | 0.5 | 1600 | 871 | 0.89 | 61 |
| 10a[3] | CO | 0.5 | 800 | 427 | 2.1 | 54 |
| 11a[3] | CO | 0.5 | 1000 | 538 | 2.7 | 49 |
| 12[3] | air | 1 | 600 | 316 | 1.3[4] | 84 |
| 12a | CO | 1 | 600 | 316 | 4.6 | 67 |

Notes:
[1] All runs with subscript a are invention runs.
[2] Catalyst was treated with 0.5 mole oxygen per mole chromium at 80° F. for activation.
[3] Chromium compound used in preparing catalyst in runs 10a, 11a and 12 was t-butyl chromate. All other catalysts made with dicumene chromium.
[4] Reactor temperature employed was 212° F. All other runs employed 215° F.

The runs in Table I have been grouped to show how the support pretreatment conditions employed affect the melt index of polyethylene produced with catalysts prepared from the treated supports and activated under the same conditions. Thus, control run 2 shall be compared with invention run 2a, control run 3 with invention run 3a, and the like. In comparing those runs, it can be seen that pretreating the support in carbon monoxide has a beneficial effect on the melt index capability of catalyst prepared from such support. Thus, the melt index capability has increased from about 1.6-fold in runs 9 vs. 9a up to about 3.6-fold in runs 6 vs. 6a in which near optimum conditions appear to be realized. A comparison of runs 3a with 10a and 5a with 11a show that catalysts prepared with dicumene chromium and t-butyl chromate are substantially equivalent in performance based on the melt index values of the polymers made with the catalysts. However, the HLMI/MI values of the polymers are somewhat higher with catalysts prepared with dicumene chromium rather than with t-butyl chromate. This suggests that somewhat broader molecular weight distribution polymer may be made with catalysts prepared with diarene chromium compounds in comparison to those made with chromic acid esters.

The effect of increasing the amount of chromium from 0.5 weight percent to 1 weight percent on catalysts otherwise identical in preparation is illustrated in runs 2a and 12a, respectively. Thus, in this instance, doubling the chromium concentration resulted in about a 3-fold increase in polymer melt index.

EXAMPLE 2 (EMBODIMENT 2)

Another series of catalysts was prepared from samples of the cogel support of Example 1 which were separately pretreated in various ambients in the fluidized bed activator used before. After the pretreatment, each support was cooled, recovered and impregnated with a 1% solution of dicumene chromium in n-hexane sufficient to give 0.5 weight percent chromium based on the dry weight of the composite. Each sample after drying was reheated in the activator for 2 hours at 600° F. in dry air, cooled, recovered and stored in a dry inert atmosphere until ready for use. As in Example 1, the flow rate of gas in the activator employed was 42 liters per hour in each run.

Ethylene was polymerized under particle form conditions employing a reactor temperature of 215° F. (102° C.).

The pretreating conditions employed and polymer MI and HLMI/MI results obtained are given in Table II.

Table II

Effect of Halogenated Support Pretreatment According To Embodiment 2

| Run No. | Support Pretreatment Ambient 1 | °C. | Ambient 2 | °C. | Polymer MI | HLMI/MI | Remarks |
|---|---|---|---|---|---|---|---|
| 1[1] | air | 871 | — | — | 0.75 | 61 | control |
| 2[2] | CO | 871 | — | — | 1.5 | 54 | (Embodiment 1) |
| 3[3] | CO + Br₂ | 649 | N₂, air | 871 | 3.9 | 80 | (Embodiment 2) |
| 4[4] | CO + Br₂ | 871 | air | 871 | 11.5 | 56 | (Embodiment 2) |
| 5 | air + Br₂ | 871 | — | — | 1.7 | 73 | (Embodiment 2) |
| 6[5] | air + COI₄ | 871 | — | — | — | — | dead catalyst |
| 7 | CO + Br₂ | 871 | — | — | 0.1 | 71 | almost dead |

Notes: All supports were brought up to 871° C. in dry air before treating with the other ambients. The air was purged with nitrogen before admitting CO to the activator in runs 2-4.
[1] Support was heated for 4 hours in air at 871° C.
[2] Support was heated for 4 hours in CO at 871° C.
[3] After contact with the bromine-CO mixture at 649° C., the temperature was raised to 871° C. while switching to nitrogen and held for 2 hours in nitrogen at 871° C. Then the nitrogen was replaced with dry air and the support heated in air for 2 hours at 871° C.
[4] After contact with the bromine-CO mixture at 871° C., the support was heated in pure CO for 1 hour at 871° C., the CO flushed out with N₂ then the support was heated in air at 871° C. for 2 hours.
[5] Weight ratio of support to CCl₄ was about 14:1. Since CCl₄ decomposes to Cl₂ + C under the conditions employed, a calculated weight ratio of support to Cl₂ was about 15:1 in this run.

Inspection of the results in Table II show in runs 2, 3 and 4 that pretreating the support in a mixture of CO and bromine which is then treated with air and finally converted into catalyst improves the melt index capability of that catalyst beyond that resulting from a CO pretreatment alone. In addition, runs 2 and 5 demonstrate that pretreating the support in a mixture of air and bromine is about equivalent to pretreating it in CO based on the melt index capability of catalysts prepared from the thus treated supports.

Analysis has shown that a surface bromide is formed when the support is bromine treated at high temperature. This bromide complex is itself injurious to the polymerization process, as in run 7. However, when the surface bromide is burned off by a high temperature air treatment (runs 3-4-5), $Br_2$ gas can be seen leaving the catalyst and the final result is a greatly improved polymerization catalyst support.

EXAMPLE 3 (EMBODIMENT 2)

A cogel similar to that used in Examples 1 and 2 containing 2 weight percent titanium was heated in nitrogen to 871° C. It was then treated with HBr for $\frac{1}{2}$ hour at 871° C. and then in air at 871° C. for $\frac{1}{2}$ hour, then nitrogen for $3\frac{1}{2}$ hours at 871° C., and then air for 1 hour at 871° C. and cooled to room temperature. It was then impregnated with chromium as in the previous examples and oxidized in air for 2 hours at 648° C. Polymerization runs were carried out as before at 107° C. The resulting ethylene polymer had a melt index of 15, HLMI/MI ratio of 34 and a productivity of 5590 g polymer/g catalyst. The induction time was 15 minutes and the run time 31 minutes. In a control run, the same type of cogel without the HBr treatment was treated with chromium acetate to give 1 percent chromium and activated in air at 871° C. for 5 hours. On polymerization of ethylene under the same conditions as above, the resulting polymer had a melt index of 2.8 and a HLMI/MI ratio of 50, and a productivity of 5620 g polymer/g catalyst and an induction time of 25 minutes and a run time of 75 minutes.

This shows better than a fivefold increase in melt index and a drastic lowering of the HLMI/MI ratio utilizing the treatment of the support set out herein. In both the invention run and the control run, the activation of the catalyst and the subsequent polymerization conditions were identical and conventional, the entire improvement being attributable to the pretreatment of the base prior to incorporation of the chromium.

EXAMPLE 4 (EMBODIMENT 2)

A sample of 10.6 grams of silica-titania cogel containing about 2 weight percent titanium and no chromium was heated in air to 871° C., held in carbon monoxide at 871° C. for 2 hours, and thereafter $\frac{1}{2}$ cc bromine was injected. The catalyst was reoxidized in air at 316° C. for 1 hour. The catalyst was found to contain 3.3 weight percent bromine based on the weight of the cogel. In another example, the catalyst was found to contain 8.3 weight percent bromine based on the weight of the cogel. When these catalysts were treated with air at 871° C., $Br_2$ could be seen leaving the silica and analysis showed the catalyst to contain no bromine. When $Br_2$ was injected into an air atmosphere in presence of the support, no bromine was found on the catalyst. The bromine does not come off at 871° C. in carbon monoxide or nitrogen.

EXAMPLE 5 (EMBODIMENT 2)

Cogel similar to that of Example 3 and containing 2 weight percent titanium was heated in air to 871° C. and then held in nitrogen at 871° C. for 2 minutes. It was then treated with a gas mixture containing $I_2$ and CO at 871° C. for 2 hours and then nitrogen for 2 minutes and then in air at 871° C. for 1 hour, and then cooled to room temperature. It was then impregnated with chromium as in the previous examples (0.5 weight percent Cr) and oxidized in air for 1 hour at 316° C. Polymerization runs were carried out as before at 102° C. This is invention Run A. In run B, the same procedure was followed except no $I_2$ was used. In Run C, the same procedure of Run A was used except the air treatment after the $I_2$ treatment was omitted. The results were as follows:

| Run | A | B | C |
|---|---|---|---|
| $I_2$ treatment | Yes | No | Yes |
| Air treatment before Cr added | Yes | Yes | No |
| MI | 7.21 | 2.83 | 1.16 |
| HLMI/MI Ratio | 55 | 53 | 69 |
| Run Time, min. | 37 | 58 | 45 |
| Productivity g/g | 4930 | 5212 | 5610 |

A comparison of runs A and B shows that a further improvement over that obtained by using CO (Run B) is obtained by also using $I_2$ (Run A). Run C shows that in order to fully achieve this advantage the treated silica must be given an oxidation treatment to remove halogen.

EXAMPLE 6 (EMBODIMENT 2)

Thirty grams of a sample of 952 Grade silica commercially available from Davison Chemical Company having a surface area of 250 sq m/g was heated in air to the desired temperature and held there for 3 hours. Then about 15 g of $I_2$ was vaporized into CO and passed through this silica over a period of 2-3 hours. The silica was then cooled to room temperature and analyzed chemically for iodine with the following results.

| Treatment Temperature, °C. | Millimoles I/g Silica |
|---|---|
| 500 | 0.02 |
| 650 | 0.02 |
| 700 | 0.15 |
| 800 | 0.31 |
| 900 | 0.09 |

In a second series identical to that above except 2 g $I_2$ instead of 15 were used, the results were:

| Treatment Temperature, °C. | Millimoles I/g Silica |
|---|---|
| 300 | 0.00 |
| 500 | 0.01 |
| 600 | 0.03 |
| 800 | 0.17 |
| 900 | 0.16 |

In a third series identical to the first except that Cab-O-Sil S-17 grade silica was used instead of Davison 952, the results were as follows:

| Treatment Temperature, °C. | Millimoles I/g Silica |
|---|---|
| 800 | 0.51 |

In a fourth series identical to the first, the results were:

| Treatment Temperature, °C. | Millimoles I/g Silica |
|---|---|
| 750 | 0.22 |

This silica was heated in air to 750° C. and the color changed from grey to yellow. It gave off a purple gas. Analysis after this burning off treatment showed 0.06 millimoles of I/g silica. In a fifth series identical to the first except that COS was used in place of CO, the results were as follows:

| Treatment Temperature, °C. | Millimoles I/g Silica |
|---|---|
| 800 | 0.22 |

EXAMPLE 7 (EMBODIMENT 2)

The iodinated silica of Example 6 having 0.22 millimoles of iodine per gram silica was used to pack a chromatographic column about 8 millimeters in diameter and 2½ inches long. Helium was the carrier gas and the column was held at 25° C. Various compounds were injected into the column and retention times were measured.

| Compound | Retention Time |
|---|---|
| air | .72 min. |
| ethylene | .80 min. |
| isobutane | 1.35 min. |
| pentane | 2.40 min. |
| hexane | >10 min. |
| heptane | >30 min. |
| CCl₄ | 6.60 min. |
| acetone | 1 day estimated visually |

In a separate run, isobutane was separated from pentane using the above described column.

EXAMPLE 8 (EMBODIMENT 2)

A portion of the iodinated silica of Example 7 was oxidized in air at 300° C. for one hour, which released I₂ gas initially. A 6¼ inch chromatographic column was made, and the following retention times were obtained at 25° C.

| Compound | Retention Time |
|---|---|
| air | .70 min. |
| ethylene | .75 min. |
| isobutane | .75–.76 min. |
| n-butane | .90–.94 min. |
| pentane | 1.34 min. |
| hexane | 2.55 min. |
| heptane | 4.3 min. (broad) |

Even though this column was twice as long as the column used in Example 7 with the iodinated silica, the retention times for most compounds are considerably less. This shows a different attraction for the silica, and further shows the difference between the two materials. It is of particular note that this column was effective in separating isobutane from normal butane as evidenced by the different retention times whereas the iodinated silica did not.

EXAMPLE 9 (EMBODIMENT 3)

Silica-titania cogel containing about 2 percent titanium was treated with carbonyl sulfide. In some instances, the support was then reoxidized and in other instances it was not. Thereafter, the support was impregnated with a dry hexane solution of dicumene chromium to give about 0.5 weight percent chromium based on the weight of the cogel. The results are shown hereinbelow in Table III.

Table III

| | Sulfur Treatment Of Cogel Support | | | | | | | | |
|---|---|---|---|---|---|---|---|---|---|
| Run No. | Support Pretreatment | Support Reoxidation | Final Reoxidation | Color | Run Temp. | MI | HLMI MI | Run Time | Prod. |
| 1 | 15% COS/870° C./1 hr. | None | 315° C./1 hr. | Orange Tan | 102° C. | 55 | 42.3 | 34 | 5700 |
| 2 | 15% COS/870° C./1 hr. | None | 480° C./1 hr. | Orange | 107° C. | 65 | 37.5 | 33 | 5060 |
| 3 | 15% COS/870° C./1 hr. | 540° C./1 hr. | 315° C./1 hr. | Orange Tan | 102° C. | 87 | — | 30 | 4460 |
| 4 | 15% COS/870° C./1 hr. | 540° C./1 hr. | 480° C./1 hr. | Orange | 102° C. | 27 | 46.1 | 27 | 6350 |
| 5 | 15% COS/870° C./1 hr. | 540° C./1 hr. | 650° C./1 hr. | Orange | 102° C. | 9.7 | 50.7 | 34 | 5160 |
| 6 | 15% COS/870° C./1 hr. | 870° C./1 hr. | 315° C./1 hr. | Orange Tan | 102° C. | 84 | — | 41 | 5160 |
| 7 | 15% COS/870° C./1 hr. | 870° C./1 hr. | 480° C./1 hr. | Orange | 102° C. | 19.2 | 50.0 | 32 | 5120 |
| 8 | 15% COS/870° C./1 hr. | 870° C./1 hr. | 650° C./1 hr. | Orange | 102° C. | 12.5 | 39.7 | 33 | 4590 |

As control runs, cogel base with no chromium was calcined in air at 870° C. for 4 hours, then impregnated with 0.5 weight percent chromium as dicumene chromium in hexane. The catalysts were then reoxidized as indicated hereinbelow in Table IV for 2 hours in air. The results are shown hereinbelow.

Table IV

| | Anhydrous Promotion of Air Activated Cogel Base | | | | | |
|---|---|---|---|---|---|---|
| Run No. | Reoxidation Temp. | Color | MI | HLMI MI | Run Time | Prod. |
| 1 | 25° C. | yellow green | no go | | | |
| 2 | 25° C.(A) | green | 0.74 | 42 | 146 | 5500 |
| 3 | 160° C. | olive | no go | | | |
| 4 | 315° C. | orange | 0.74 | 61 | 53 | 4810 |
| 5 | 315° C.(B) | orange | 1.3 | 46 | 70 | 5210 |
| 6 | 425° C. | orange | 0.88 | 58 | 45 | 5030 |
| 7 | 540° C. | orange | 1.2 | 51 | 40 | 5470 |
| 8 | 650° C. | orange | 0.87 | 61 | 42 | 4870 |
| 9 | 760° C. | orange | 0.55 | 67 | 33 | 4970 |
| 10 | 870° C. | orange | 0.56 | 78 | 40 | 5430 |

Polymerization was done at 102° C. and 550 psig ethylene. All MI values have been corrected to 5000 gm/gm productivity.

(A) 0.5 mole O₂/mole Cr injected into a N₂ stream.
(B) Run at 105° C.

As can be seen, much improved melt index values are obtained utilizing the invention as set out in the data from Table III. Indeed, the improvement for embodiment 3 is not only greater than the control runs from Table IV but also superior to the results as shown in embodiments 1 and 2. As can be seen, melt index values ranging from 0.5 to 1.2 are obtained with the control compared with values ranging from 1.2 to 11.5 for embodiments 1 and 2; however, values ranging up to 87 are obtained with embodiment 3.

In embodiment 3, the preferred reoxidation temperature is lower than the preferred temperature in embodiments 1 and 2.

In comparing runs 1, 3 and 6 of Table III, each catalyst being reoxidized at 315° C. for 1 hour, it is seen that melt index potential of the catalyst is increased by reoxidizing the treated support at an elevated temperature, i.e., 540° to 870° C., prior to impregnation with the Cr compound. On the other hand, the preferred reoxidation temperature employed for the catalyst is about 315° C. As the final reoxidation temperature exceeded 315° C., the melt index of polymer produced with that catalyst decreased, i.e., 87 for run 3 at 315° C., 27 for run 4 at 480° C. and 9.7 for run 5 at 650° C. (Run 2 is higher than run 1 because it is the only one run at a higher reactor temperature).

Unlike in the bromine or iodine treatment, analysis of the sulfur treated catalyst bases shows that no sulfur is left behind on the support. That is, immediately after the treatment with, say carbonyl sulfide, the material can be cooled and analyzed and no sulfur is found on the support.

While this invention has been described in detail for the purpose of illustration, it is not to be construed as limited thereby but is intended to cover all changes and modifications within the spirit and scope thereof.

I claim:

1. A method for producing a catalyst comprising subjecting a silica-containing support at an elevated temperature to a treating ambient selected from (1) carbon monoxide, (2) a halogen-containing component selected from bromine, iodine, HBr, HI, organic bromides, and organic iodides, which halogen-containing component also either contains air or is followed by air or (3) a carbon, oxygen and sulfur-containing composition, thereafter incorporating a chromium compound under anhydrous conditions to thus form said catalyst and thereafter activating said catalyst in an oxygen ambient.

2. A method according to claim 1 wherein after said incorporation of said chromium compound said catalyst is activated in an oxygen ambient at a temperature within the range of 15°–870° C. for a time of at least 5 minutes.

3. A method according to claim 1 wherein said silica is a coprecipitated silica-titania cogel.

4. A method according to claim 1 wherein said chromium is incorporated in an amount sufficient to give 0.1 to 5 weight percent chromium based on the weight of said support.

5. A method according to claim 1 wherein said support is a silica-titania cogel containing 0.5 to 5 weight percent titanium based on the weight of said cogel. tion conditions after being subjected to said ambient and prior to incorporation of said chromium compound.

6. A method according to claim 1 wherein said chromium compound is incorporated by means of an inert liquid hydrocarbon diluent or solvent.

7. A method according to claim 1 wherein said support is preoxidized by being subjected to oxidation conditions after being subjected to said ambient and prior to incorporation of said chromium compound.

8. A catalyst produced by the method of claim 1.

9. A method according to claim 5 wherein said treating ambient is carbon monoxide.

10. A method according to claim 5 wherein said treating ambient is bromine vapor.

11. A method according to claim 5 wherein said treating ambient is HBr.

12. A method according to claim 5 wherein said treating ambient is bromine + air.

13. A method according to claim 5 wherein said treating ambient is iodine vapor.

14. A method according to claim 5 wherein said treating ambient is HI.

15. A method according to claim 5 wherein said treating ambient is iodine + air.

16. A method according to claim 5 wherein said treating ambient is said halogen-containing component of (2) and wherein said halogen-containing component is bromine and wherein said ambient contains in addition carbon monoxide.

17. A method according to claim 5 wherein said treating ambient is said halogen-containing component of (2) and wherein said halogen-containing component is iodine and wherein said ambient contains in addition carbon monoxide.

18. A method according to claim 5 wherein said treating ambient is carbonyl sulfide.

19. A method according to claim 5 wherein said elevated temperature is within the range of 750°–925° C.

20. A method according to claim 6 wherein said chromium compound is one of a $\pi$-bonded organochromium compound, esters of chromic acid, and chromium acetylacetonate.

21. A method according to claim 7 wherein said support is a silica-titania cogel containing about 2 weight percent titanium, said elevated temperature is within the range of 750°–925° C., said chromium compound is selected from tertiary butyl chromate, and dicumene chromium carried in normal hexane, and wherein said preoxidation is carried out at a temperature within the range of 525°–925° C., and wherein after said incorporation of said chromium compound said catalyst is activated by heating in air at a temperature within the range of 315°–760° C.

22. A catalyst produced by the method of claim 21.

23. A method for producing an iodinated or brominated silica comprising subjecting a silica-containing composition at a temperature within the range of 500°–1000° C. under reducing conditions to a treating ambient selected from at least one of (a) elemental iodine or elemental bromine plus a reducing agent; (b) HI or HBr or (c) an organic iodide or organic bromide.

24. A method according to claim 23 wherein said treating ambient comprises 0.1 to 10 mole percent of iodine or bromine, the remainder being said reducing agent, said reducing agent comprising carbon monoxide.

25. A method according to claim 24 wherein said elevated temperature is within the range of 750°–925° C.

26. A method according to claim 24 wherein said treating ambient consists essentially of iodine vapor plus CO.

27. A method according to claim 24 wherein said treating agent consists essentially of bromine plus carbon monoxide.

28. A composition comprising silica containing 0.01–20 weight percent of a halogen selected from bromine and iodine based on the weight of said silica, said composition being further characterized by said halogen being bound directly to silicon atoms.

29. A composition according to claim 28 wherein said halogen is iodine and is present in an amount within the range of 3–10 weight percent based on the weight of said silica.

30. A composition according to claim 28 wherein said halogen is bromine and is present in an amount within the range of 3–10 weight percent based on the weight of said silica.

31. A composition according to claim 29 wherein said silica is produced by coprecipitating silica and titanium.

32. A composition comprising silica containing 0.001 to 1 millimoles of a halogen selected from bromine and iodine per 100 square meters of surface area of said silica, said composition being further characterized by said halogen being bound directly to silicon atoms.

33. A composition according to claim 32 containing 0.03 to 0.3 millimoles of said halogen per 100 square meters of surface area of said silica.

34. A composition according to claim 32 wherein said silica is produced by coprecipitating silica and titanium.

35. A composition according to claim 32 further characterized by said halogen not coming off at 871° C. in CO or $N_2$.

36. A composition according to claim 32 wherein said halogen is iodine.

37. A composition according to claim 32 wherein said halogen is bromine.

38. A composition comprising silica containing 0.01–20 weight percent of a halogen selected from bromine and iodine based on the weight of said silica, said composition being further characterized by said halogen not coming off at 871° C. in CO or $N_2$.

39. A composition according to claim 38 wherein said halogen is iodine.

40. A composition according to claim 38 wherein said halogen is bromine.

41. A method of making a free radical containing silica composition comprising subjecting a silica-containing composition at a temperature within the range of 500°–1000° C. under reducing conditions to a treating ambient selected from (a) elemental iodine plus a reducing agent; (b) HI or (c) an organic iodide and thereafter treating the resulting halogen-containing silica in an oxygen-containing ambient to burn off surface halogen.

42. A method according to claim 41 wherein said treatment to burn off surface halogen is carried out in air.

43. A silica composition produced by the method of claim 41.

44. A method according to claim 42 wherein said treatment to burn off surface halogen is carried out at a temperature within the range of 525°–925° C. for a time within the range of 1 to 5 hours.

45. A method according to claim 42 wherein said treating ambient is elemental iodine plus carbon monoxide.

46. A method according to claim 42 wherein said silica is a silica-titania cogel containing about 2 weight percent titanium.

47. A composition according to claim 43 having an ESR g value within the range of 1.8 to 2.2.

48. A composition according to claim 43 wherein said silica is a silica-titania containing cogel containing about 2 weight percent titanium.

* * * * *